US005717432A

United States Patent [19]

Miwa et al.

[11] Patent Number: 5,717,432
[45] Date of Patent: Feb. 10, 1998

[54] SIGNAL INPUT DEVICE

[75] Inventors: Yoshihisa Miwa; Shunju Anzai; Hideo Matsuda, all of Nara; Takashi Kubo, Yamatokoriyama; Toshiki Ohgita, Nara-ken, all of Japan

[73] Assignee: Sharp Kabushiki Kaisha, Osaka, Japan

[21] Appl. No.: 376,066

[22] Filed: Jan. 20, 1995

Related U.S. Application Data

[63] Continuation of Ser. No. 74,285, Jun. 8, 1993, abandoned, which is a continuation of Ser. No. 756,217, Sep. 5, 1991, abandoned.

[30] Foreign Application Priority Data

Sep. 6, 1990 [JP] Japan ................................. 2-238788
Jul. 29, 1991 [JP] Japan ................................. 3-188650

[51] Int. Cl.$^6$ ................................................. G09G 5/00
[52] U.S. Cl. ................................. 345/173; 178/18
[58] Field of Search .............................. 345/156, 173, 345/174, 175, 177; 178/18, 19; 355/75, 200, 202, 218, 243, 266, 271

[56] References Cited

U.S. PATENT DOCUMENTS

| | | | |
|---|---|---|---|
| 4,853,494 | 8/1989 | Suzuki | 340/712 |
| 4,870,458 | 9/1989 | Shibuya et al. | 340/712 |
| 4,937,762 | 6/1990 | Todome | 355/243 |
| 5,017,913 | 5/1991 | Kaneko et al. | 340/712 |
| 5,049,933 | 9/1991 | Yamada | 340/712 |
| 5,070,325 | 12/1991 | Tanaka et al. | 340/712 |
| 5,084,730 | 1/1992 | Deguchi | 355/75 |

FOREIGN PATENT DOCUMENTS

| | | |
|---|---|---|
| 63 182 731 | 7/1988 | Japan . |
| 63 214 070 | 9/1988 | Japan . |
| 63-244068 | 10/1988 | Japan . |
| 1-231070 | 9/1989 | Japan . |

OTHER PUBLICATIONS

Research Disclosure, No. 291, Jul. 1988, p. 494.

Ruediger W. Knodt, et al., "Hard Controls on touch panel surface", *Xerox Disclosure Journal*, vol. 13, No. 4, Aug. 1988, p. 195.

J.H. Dodge, et al., "Microcomputer Control of Copier", *IBM Technical Disclosure Bulletin*, vol. 24, No. 12, May 1982, pp. 6356–6359.

*Primary Examiner*—Xiao Wu
*Attorney, Agent, or Firm*—David G. Conlin; George W. Neuner; Brian L. Michaelis

[57] ABSTRACT

A signal input device which includes an operation panel having an input area in which data are input by touching the operation panel, a plurality of sensors located at different places on the operation panel, the sensors receiving vibrations propagated from a touched point on the operation panel, a detection circuit for detecting times at which the sensors receive the vibrations, an arithmetic means for identifying the position of the touched point, a memory means for storing numerical values whereby the input area is divided into a plurality of minor areas, and means for judging which minor areas the touched points belong to, on the basis of the arithmetic results of the numerical values and data about the positions of the touched points.

30 Claims, 7 Drawing Sheets

SIGNAL INPUT DEVICE

This is a continuation of application Ser. No. 08/074,285 filed on Jun. 8, 1993, which is a file wrapper continuation of Ser. No. 07/756,217 filed on Sep. 5, 1991, now both abandoned.

BACKGROUND OF THE INVENTION

1. Field of the Invention

The present invention relates to a signal input device for inputting required data in response to points designated by touching a control panel.

2. Description of the Prior Art

Various methods are in use for inputting data as signals:

One method is to use a key board on which data are input by keys. Each key is provided with a sensors (e.g. a contact switch) for detecting the input. This method is mainly used in electronic appliances. Another method is to use, in addition to the key board, a signal input device designed to designate an image-reading area or an image-non-reading area. This type of signal input devices adopt the following methods:

One method is for an operator to overlap a copying image on a lattice-scaled transparent sheet, and read the scales on the X-axis and Y-axis so as to input point by point through a ten-key key board.

Another is to mark scales along the X-axis and Y-axis on a glass plate on which an original is placed, and read the scales so as to enable an operator to input in response to points designated through a ten-key key board.

A third method is to provide arrays of switches equally spaced along the X-axis and Y-axis, respectively on an original glass plate, and enable an operator to input a coordinate designate by switches.

A fourth method is to provide a planar matrix array sensor on a cover covering an original, and to input into the sensor by an input pen.

The first and second methods can be economically achieved, but are not efficient in operation. The third method is also inefficient because of the dual operations of the X-axis and Y-axis.

The fourth method is more efficient than the other methods but disadvantageously costly because of the expensive matrix array. In addition, the glass plate must be completely transparent and exactly flat so as to avoid erroneous readings, and therefore, a special tray or the like must be used for supporting the matrix array sensor. The original must be shifted from the glass plate to the tray.

Japanese Laid-Open Patent Publication No. 63-244068 proposes a device which is used in cooperation with a ready-made original glass plate so as to designate copying parts of the original placed on the glass plate. This device includes an input pen incorporating an oscillator and at least three vibration detectors around the glass plate. When an operator touches the original glass plate with the input pen, the three detectors detect time intervals on the basis of reception of signals from the touching so as to specify the touching points. The 63-244068 Publication does not disclose a means or structure for specifying the touching points in detail but it is presumed that the cost will be reduced because a ready-made glass plate is used, and no key input device or matrix array is required.

The first and fourth method require an extra input device for inputting copying data in addition to a key input device for designating the inputting areas. The 63-244068 Publication discloses the designation of an inputting area but fails to disclose that the glass plate is used as the input device.

SUMMARY OF THE INVENTION

The signal input device of this invention, which overcomes the above-discussed and numerous other disadvantages and deficiencies of the prior art, comprises an operation panel including an input area in which data are input by touching the operation panel, a plurality of sensors located at different places on the operation panel, the sensors receiving vibrations propagated from a touched point on the operation panel, a detection circuit for detecting the time at which the sensors receive the vibrations, an arithmetic means for identifying the position of the touched point, a memory means for storing numerical values whereby the input area is divided into a plurality of minor areas, and means for judging which minor areas the touched points belong to, on the basis of the arithmetic results of the numerical values and data about the positions of the touched points.

Alternatively, a signal input device comprising a transparent glass panel a first area in which an original is placed and a second area in which the original is not placed, a plurality of sensors located at the second place, the sensors receiving vibrations propagated from a touched point on the glass panel, a detection circuit for detecting the time at which the sensors receive the vibrations, an arithmetic means for identifying the position of the touched point on the basis of the detected time, a memory means for storing the second area of the glass panel as an input area for allowing copying data to be input, means for judging to see whether the position of a touched point identified by the arithmetic means is in the first area or not, on the basis of the data stored in the memory means, and a control means for using the result obtained by the judging means as input about the original when it arises from the fist area or as input from copying data when it arises from the second area.

Alternatively, a signal input device for use in a copying machine, the device comprising an operation panel having an input area allowing a touched input therein, a plurality of sensors located at different places on the operation panel, the sensors receiving vibrations propagated from a touched point on the operation panel, a detection circuit for detecting time at which the sensors receive the vibrations, an arithmetic means for identifying the position of the touched point on the basis of the detected time, a memory means for storing numerical values whereby the input area is divided into a plurality of minor areas, means for judging which minor areas the touched points belong to, on the basis of the arithmetic results of the numerical values and data about the positions of the touched points, wherein the arithmetic means comprises means for starting the arithmetic operation by treating the received time detected by the detection circuit as effective, when the copying machine is in a stable operation state.

Thus, the invention described herein makes possible the objectives of (1) providing a signal input device which eliminates the necessity of providing switches and/or sensors corresponding to operation keys, (2) providing a planar type of signal input device, and (3) providing a signal input device easily attached to a copying machine.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
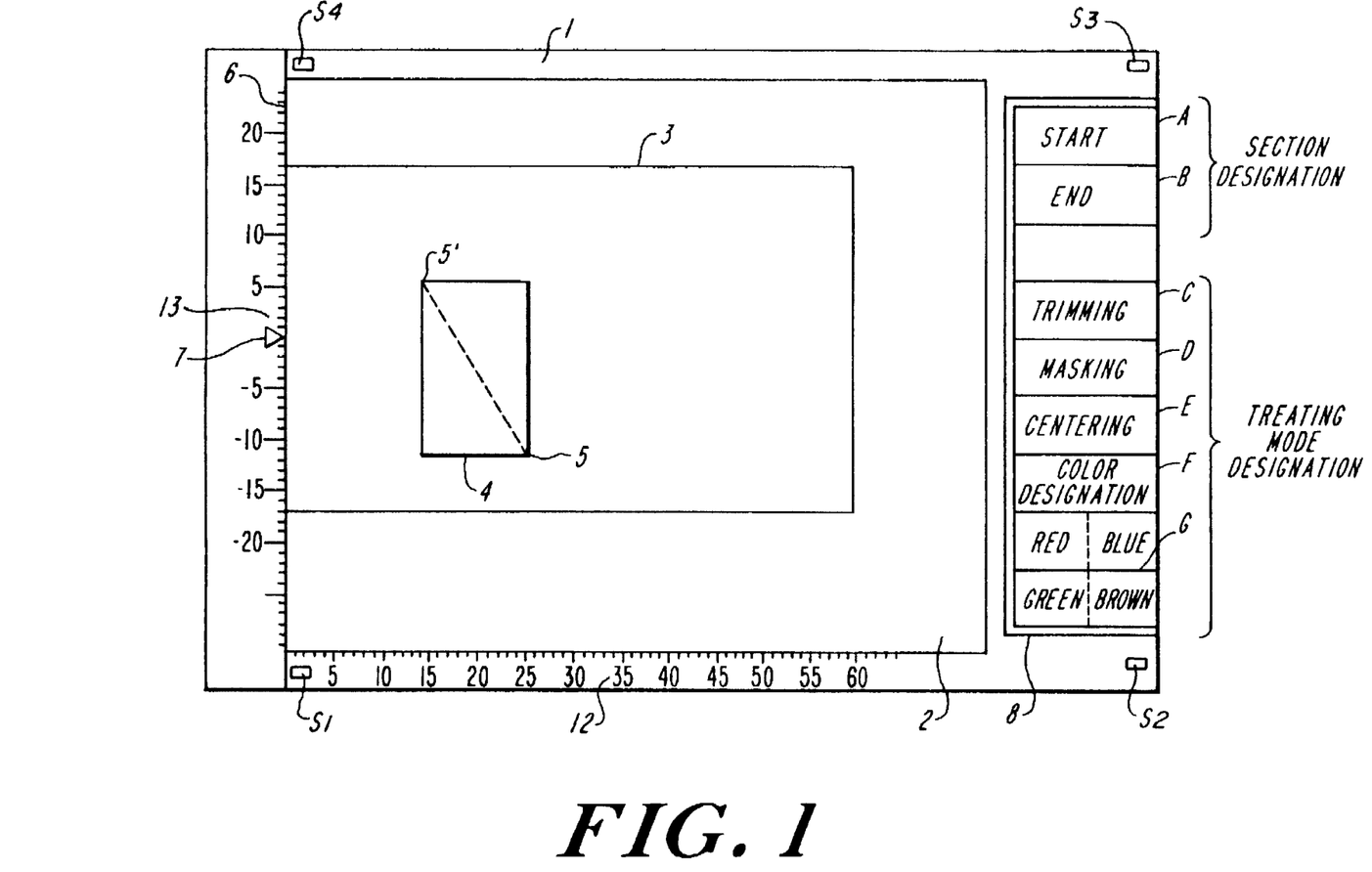
FIG. 1 is a plan view showing a copying machine equipped with a signal input device of the present invention on the original glass plate thereof.

Referring to FIG. 1, there is provided a transparent glass panel 1 having a copiable area 2 in which an original 3 can be copied. If the original 3 is placed out of the copiable area 2, it cannot be copied. A designating area 4 is provided, having diagonals 5 and 5'. The reference numeral 6 designates a reference line along which the forward end of the original 3 is place, and the reference numeral 7 designates an index which indicates the center line of an image to be reproduced as the origin (0, 0).

An input panel 8 is located on the right side of the copying machine, through which various copying data and other necessary data are input. The input panel 8 is provided by printing on the top surface or the back surface of the glass panel 1. Necessary items are printed thereon. The input panel 8 can include several sections depending upon functions, such as sections A and B both for designating input points, sections C to F for designating treating modes, such as trimming, masking, centering, color designation, and section G for selecting color in accordance with the designation of a mode by the section F. In addition, it is possible to provide a ten-key key board for inputting digital data by a printing method. The glass panel 1 is additionally provided with reference scales 12 and 13 along the Y-axis and X-axis.

Sensors $S_1$ to $S_4$ are directly stuck to the front surface or the back surface of the glass panel 1 at each corner. These sensors $S_1$ to $S_4$ are to detect touched points by sensing vibrations propagated from the touched point; more specifically, they detects the times for receiving signals.

An original is placed on the glass panel 1 whereby a designated point 5 of the original is input as a position signal to the copying machine. In this way a copying area is designated. Apart from this manner of designation, it is also possible to input copying data to the copying machine through the input panel 8, as follows:

Any pint is touched on the glass panel 1, from which vibrations are propagated to each sensors $S_1$ to $S_4$. The sensors $S_1$ to $S_4$ detect or receive the vibrations at different times depending upon the distances from the touched points. The position of a touched point can be calculated by reference to a reference point; for example, the index 7. In this way, it is possible to recognize whether it is a touched point entered in the input panel 8 or the copiable area 2. In addition, the input panel 8 enables the operator to identify the particular position in the input panel 8 to be input by touching.

An operation of the signal input device of the present invention will be described as an example when it is used in a copying machine:

Step 1: An original 3 is placed in the copiable area 2 with the center line thereof aligned with the index 7 and with one edge thereof being alongside the reference line 6.

Step 2: The start area in the section A is touched by a pen, and then a state is reached in which the position of the original 3 can be designated. The designated area 4 is set by touching the two points 5 and 5'. When a plurality of designated areas are to be set, the above-mentioned procedure is repeated.

Step 3: When the designation is finished, the section B is touched so as to input the data obtained by Step 2 to the copying machine.

Step 4: Various treating modes such as trimming, masking, centering, color designating, etc, are operable on the original 3 after the position is designated by the above-mentioned procedure. These modes can be input in the respective sections C to F.

Then, the original 3 is turned upside down on the copiable area 2. The turned original 3 is set by being placed alongside the reference line 6, and then the print switch on the copying machine is pressed. In this way the copying is carried out in an input mode.

Figure 2:
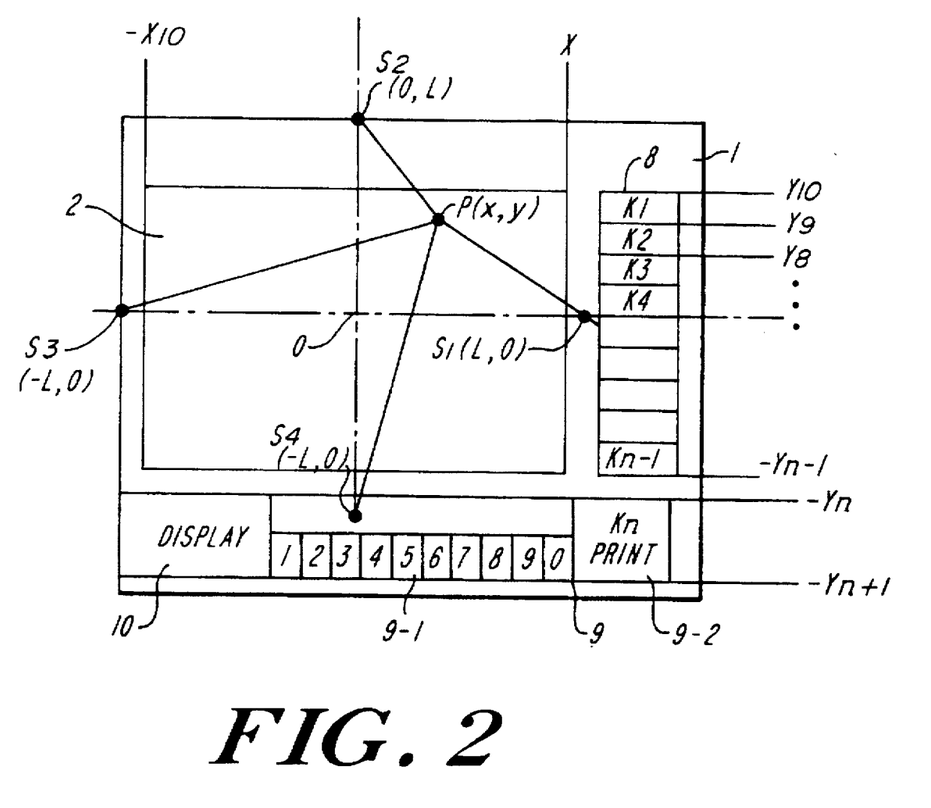
FIG. 2 is a plan view showing another example of the signal input device of the present invention.

Referring to FIG. 2, a modified example of the embodiment will be described:

The sensors $S_1$ to $S_4$ are provided at the center of each side of the copiable area 2, slightly spaced outside the respective sides. Two input panels 8 and 9 are provided on two sides (in FIG. 2, the lower and the right sides) by printing so as to enable an operator to input by key. These two input panels 8 and 9 are provided on the same glass panel 1. The sensors $S_1$ and $S_3$ are on the X-axis and the sensors $S_2$ and $S_4$ are on the Y-axis, so as to locate the origin (0, 0) at the center of the copiable area 2.

The copying machine is equipped with an input section on the glass panel 1 through which required copying data are input, and a liquid crystal display section 10 is also provided. By touching the display, desired data can be input as displayed.

The input panel 9 includes a sections 9-1 and 9-2 for inputting digital data and starting the copying operation, respectively. The sections 9-1 and 9-2 are printed on the glass panel 1. The input data are displayed on the liquid crystal display section 10.

Figure 3:
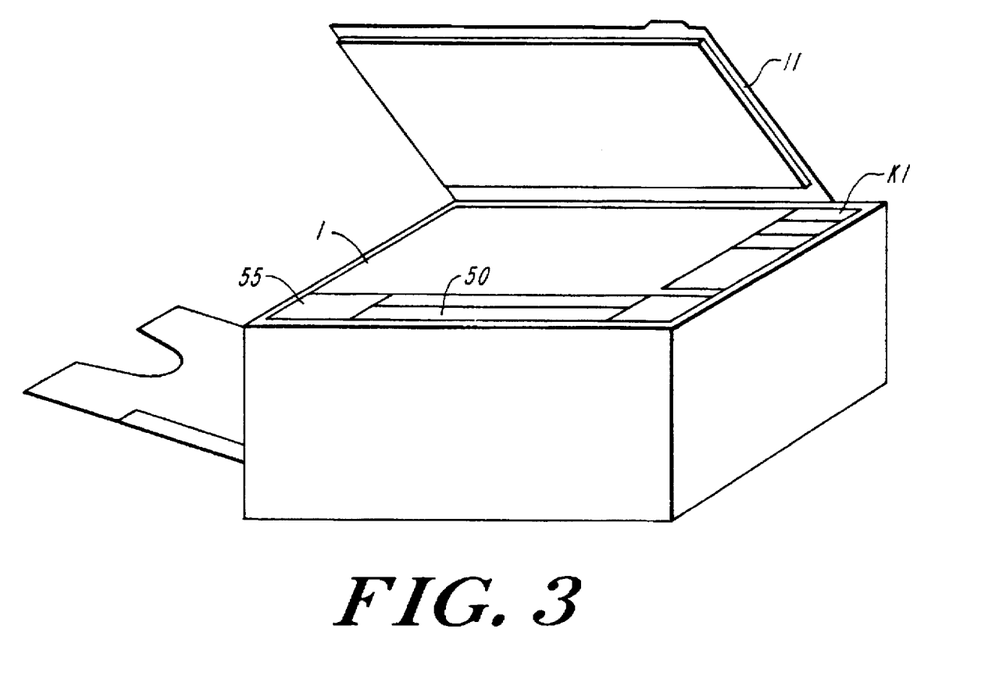
FIG. 3 is a perspective view showing a copying machine equipped with the signal input device of FIG. 2.

FIG. 3 is a perspective view showing a copying machine equipped with the input device shown in FIG. 2, wherein a cover 11 is opened.

Figure 4:
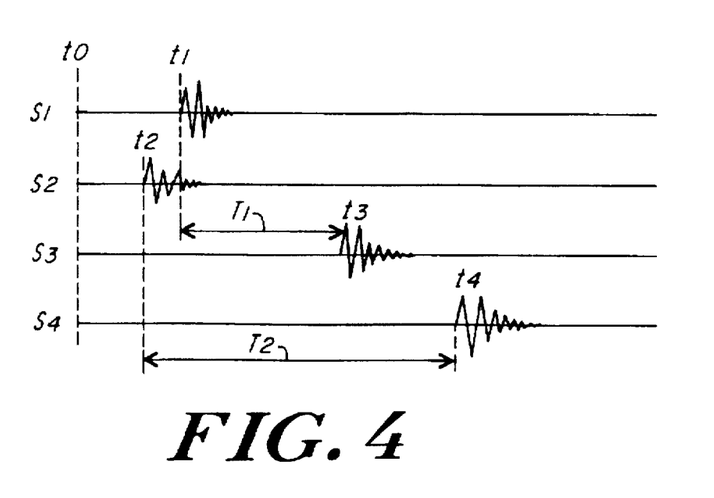
FIG. 4 is a timing chart showing the operation of the signal input device of FIG. 2, particularly to show shock waves being transmitted through the surface of a table glass or the substance thereof and reaching sensors.

Referring to FIG. 4, the input device shown in FIG. 2 is operated by touching a designated point P (X, Y) on the glass panel 1 with a pen or the like, the shock waves are propagated on the surface of the glass panel 1 or through it, and reach the respective sensors $S_1$ to $S_4$. The resulting timing chart is shown in the graph. $t_0$ shows a time when a designated point is touched, and $t_1$ to $t_4$ show times when the sensors $S_1$ to $S_4$ detect the shock waves. $T_1$ and $T_2$ show time differences in detection between the sensors $S_1$ and $S_3$, and between the sensors $S_2$ and $S_4$.

Figure 5:
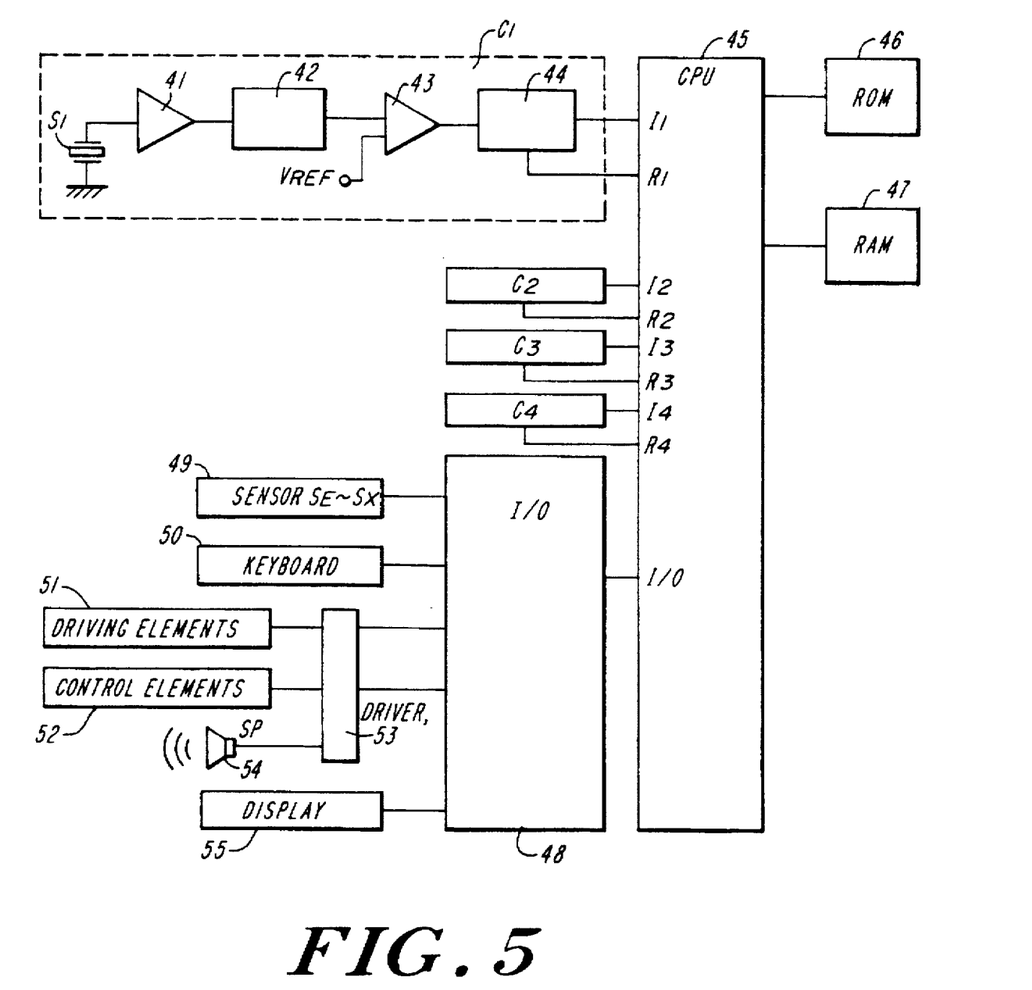
FIG. 5 is a block diagram used for the signal input device and the circuit of a copying machine.

Referring to FIG. 5, a circuit included in a copying machine equipped with the input device of the present invention will be described:

The sensors $S_1$ to $S_4$ convert the vibrations into electrical signals, and if this function is performed, any device such as piezo sensors, strain sensors, or mini-microphones can be used.

The sensor $S_1$ constitutes part of a detector circuit $C_1$ which includes an amplifier 41, a filter 42, a comparator 43 and a latch 44. The vibrations detected by the sensor $S_1$ are converted into electrical signals, and amplified into a predetermined voltage by the amplifier 41. The amplified voltage is trimmed by the filter 42 so as to remove unnecessary frequencies. Then the voltage is compared by the comparator 43 and when it reaches a predetermined value or exceeds it, it is detected as an effective signal, which is immediately sent to the latch 44. The time at which the effective signal comes out from the latch 44 is detected by a microcomputer (CPU) 45 which generates a reset signal $R_1$, thereby holding the output of the latch 44. The circuit $C_1$ is a detector circuit which comprises the arrangement from the sensor $S_1$ to the latch 44. Likewise, circuits $C_2$ to $C_4$ are detector circuits including the sensors $S_2$ to $S_4$, respectively.

In addition, the CPU 45 is connected to a read-only memory (ROM) 46 which stores a required set of programs based on the data required to effect arithmetic calculation for identifying the designated point or points 4 and to execute the copying, the data being received from the input panels 8 and 9. The CPU 45 is also connected to a random access memory (RAM) 47 which temporarily stores the detected time of the sensors $S_1$ to $S_4$, the results of the arithmetic calculation for identifying the touched points, the copying data, and the copying state, an input/output port 48 which is used in increasing the number of input and output terminals and controlling same. A sensors group 49 including sensors $S_5$ to $S_x$, a key board 50, several driving elements 51, control elements 52, an aural transmitter 54, and a driver 53 for driving the driving elements 51, the control elements 52 and the aural transmitter 54, and a display device (the liquid crystal display section 10) 55 are connected to the input/output port 48.

The CPU 45 outputs a signal which latches the latch 44 in the detection circuit $C_I$ only when the copying machine is "ready" but does not output when the copying machine is in operation or at a rise-up or warm-up time, hereinafter called "rise-up", after it is switched on. During this period of time, even if the sensors $S_1$ to $S_4$ detect vibrations and the effective signals are output by the comparator 43, these signals are ignored. While the copying machine is at a rise-up time or in operation, the sensors $S_1$ to $S_4$ indiscriminately detect every vibration such as vibrations inherent to the copying machine which are caused by the rotation of the photosensitive drum and the operation of various driving mechanism. To avoid detecting unnecessary vibrations, it is devised so that the signal detected by the CPU 45 is detected only at the "ready" state, and found to be effective, and then the arithmetic operation is started so as to identify touched points.

Any point P designated by touching is identified by arithmetic calculation in the following manner:

The program for this arithmetic operation is stored in the ROM 46, wherein the arithmetic operation is conducted by calculating time differences (shown in FIG. 4) in detecting vibrations by the sensors $S_1$ to $S_4$.

In FIG. 2, suppose that the coordinates of the sensors $S_1$ to $S_4$ are respectively (L, 0), (0, L), (−L, 0) and (0, −L), and that the coordinate of the designated point is (x, y). Vibrations are supposed to propagate through the glass panel 1 at a speed of v m/sec.

The propagating speed of vibrations through the glass panel depends upon the material and the manufacturing method of the glass panel 1, normally 3,000 to 4,500 m/sec, and in the soda glass, it is about 4,300 m/sec.

Time differences $T_1$ in signal reception between the sensors $S_1$ and $S_3$ on the X-axis is equal to a value obtained by dividing the linear distances from the point P to the sensors $S_1$ and $S_3$ by the speed v. This relationship is expressed by the following equation:

$$T_1 = t_3 - t_1 \qquad (1)$$
$$= \frac{\sqrt{(L+x)^2 + y^2} - \sqrt{(L-x)^2 + y^2}}{v}$$

Likewise, time difference $T_2$ in signal reception between the sensors $S_2$ and $S_4$ on the Y-axis is equal to a value obtained by dividing the linear distances from the point P to the sensors $S_1$ and $S_3$ by the speed v. This relationship is expressed by the following equation:

$$T_2 = t_4 - t_2 \qquad (2)$$
$$= \frac{\sqrt{x^2 + (L+y)^2} - \sqrt{x^2 + (L-y)^2}}{v}$$

The equations (1) and (2) are simplified as follows:

$$y^2 = \frac{A_1}{B_1} x^2 - A_1 \qquad (3)$$

$$A_2 x^2 - B_2 y^2 + A_2 B_2 = 0 \qquad (4)$$

From the equations (3) and (4), x and y are expressed by the following equations (5) and (6):

$$x = \pm \sqrt{\left| \frac{B_1 B_2 (A_1 + A_2)}{A_1 B_2 - A_2 B_1} \right|} \qquad (5)$$

$$y = \pm \sqrt{\left| \frac{A_1 A_2 (B_1 + B_2)}{A_1 B_2 - A_2 B_1} \right|} \qquad (6)$$

In the equations (5) and (6)

$$A_1 = \frac{L^2 - K_1^2}{2} \quad A_2 = \frac{L^2 + K_2^2}{2} \qquad (7)$$

$$B_1 = \frac{L^2 + K_1^2}{2} \quad B_2 = \frac{L^2 - K_2^2}{2}$$

$$K_1^2 = \frac{T_1^2 v^2}{2} - L^2 \quad K_2^2 = \frac{T_2^2 v^2}{2} - L^2$$

On the basis of the above-mentioned equations, the coordinate (x, y) of the point P designated by touching can be sought by arithmetic calculation. The arithmetic operation is effected by detecting the times $t_1$ to $t_4$ of the sensors $S_1$ to $S_4$ by the CPU 45 in accordance with the program stored in the ROM 46.

Figure 6:
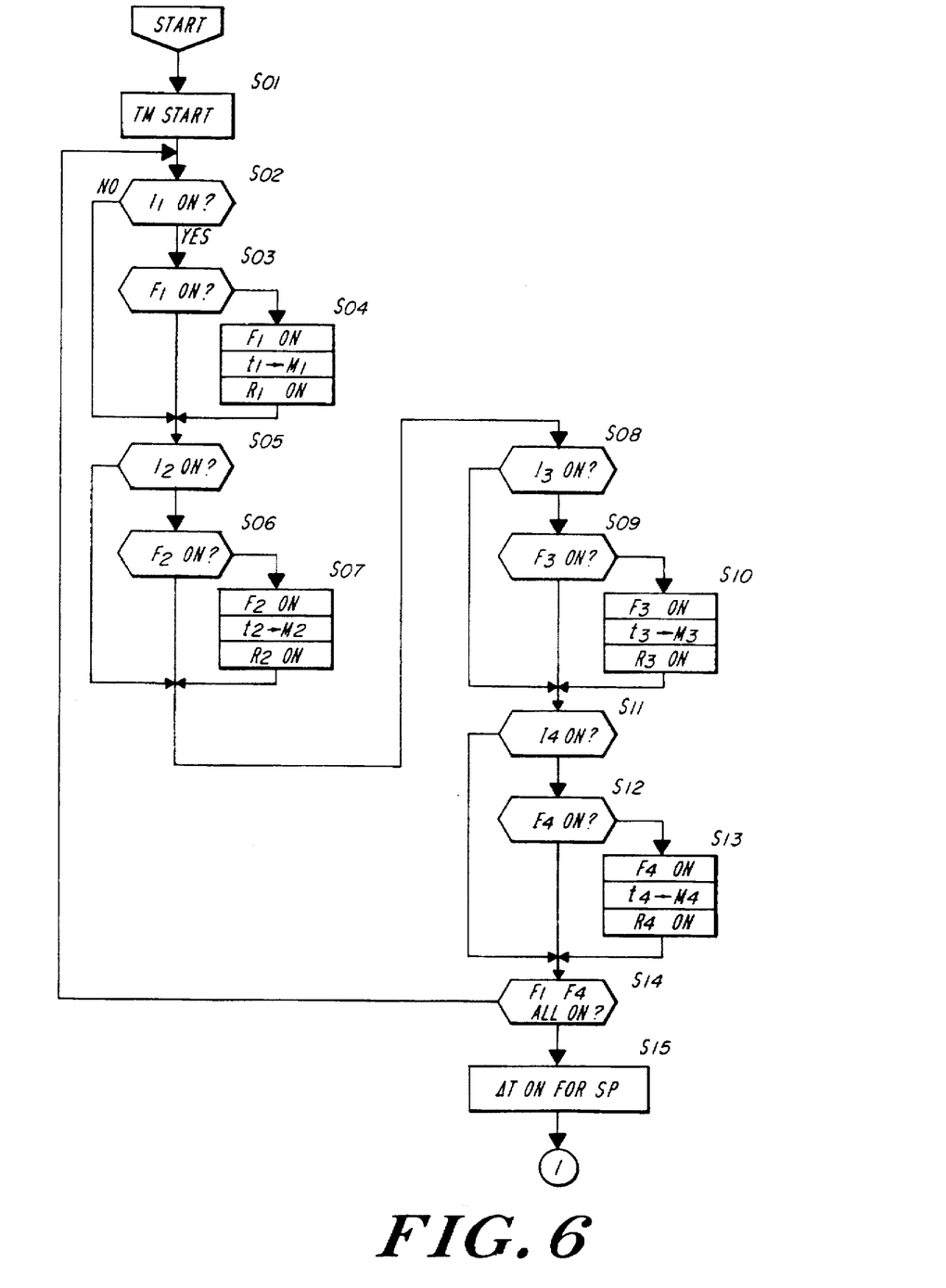
FIG. 6 is a flowchart exemplifying the steps of timing detection in the range of $t_1$ to $t_4$ in FIG. 4.
Figures 7, 8:
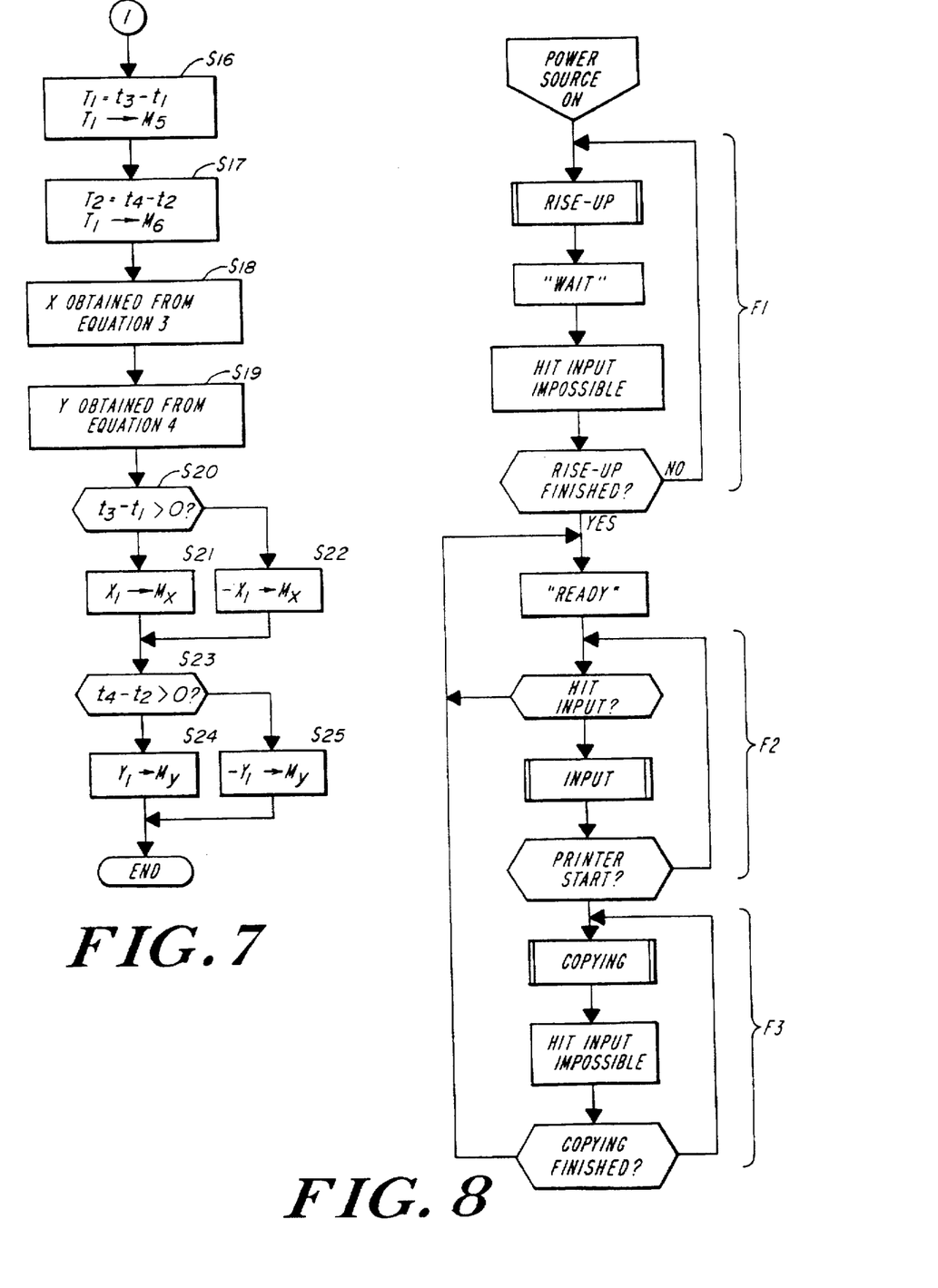
FIG. 7 is a flowchart showing the steps for seeking coordinates (X, Y) of designated points through arithmetic operation of the times $t_1$ to $t_4$ obtained from the flowchart of FIG. 6.
FIG. 8 is a flowchart showing the steps to be taken for detecting designated points prior to signal inputting.

Referring to FIGS. 6 to 8, the manner of detecting the times $t_1$ to $t_4$ will be described:

As described above, the detection is ignored when the copying machine is at the rise-up time and in operation, and the arithmetic operation on the basis of vibration detection is not executed.

In FIG. 8, the copying machine is switched on (start), and the rise-up or warm-up process starts at Flag $F_1$, continuing until the copying machine comes into the "ready" state, where, for example, the fixing section is energized, the photosensitive drum is put into idle rotation (for electrical charging or discharging) and any other preparatory operations are performed (toward the "ready" state). During this period, "Wait" is displayed, and inputs of any touched point are ignored.

When the copying operation is ready, "Ready" is displayed, and the sequence proceeds to the next Flag $F_2$. When a touched input is detected, it is judged to see if it arises in the printer start section. If it is not, the touching input is again detected. If any area designation or copying data are input, the corresponding process is executed, ad a touching input is detected. When the touching input is judged to be the printer start signal, Flag $F_3$ is executed so as to start the copying operation under the previously input copying data and the point designation. At this stage and thereafter until the copying operation is finished and the "Ready" state is restored, any touching input is ignored.

The treatment of a touched input at Flag $F_2$ will be described in detail by reference to FIG. 6:

Step 01 is possible to start only when the operational panel is ready to be operated; for example, the copying operation is ready. This corresponds to Flag $F_2$ where a touched input is processed.

When the sequence is started, a timer TM starts, which counts by 0.1 μsec so as to allow an error in the range of ±1 mm for identifying the position of a touched point. The reason is as follows:

$$1 \text{ mm} \div 4,300 \text{ m/sec} = 0.23 \text{ μsec}$$

where 4,300 m/sec is an acoustic wave propagating speed of soda glass.

If the times sensed by the sensors are detected at two or more cycles, the tolerance is reduced to 1 mm or less. This allows a count unit of about 0.1 μsec.

Step 02 decides whether or not an effective signal $I_1$ comes from the sensor $S_1$. This effective signal means a signal which is recognized by the CPU 45 when it is input from the latch 44 in the detection circuit $C_1$ in FIG. 5.

Step 03 decides whether a detecting Flag $F_1$ is on or not when the signal $I_1$ is detected.

Step 04 switches on Flag $F_1$ upon detection of the signal $I_1$, and the time of a timer TM is stored in a memory area $M_1$ of the RAM 47 as a detecting time $t_1$. Then, in order to fix the output of the latch 44 to "low", the output $R_1$ of the CPU 45 is turned on.

At Steps 05 to 07, if the signal $I_1$ is not detected at Step 02 or Flag $F_1$ is already on at Step 03 or all processes at Step 04 are finished, the sequence proceeds to Step 05. The time $t_2$ of the sensor $S_2$ is detected by the same procedures followed from Steps 02 to 04.

At Steps 08 to 13, the times $t_3$ and $t_4$ of the sensors $S_3$ and $S_4$ are detected by the same manner.

Steps 14 judges Flags $F_1$ to $F_4$ as being on, if the detection of all the times $t_1$ to $t_4$ is finished from Steps 02 to 13, the sequence proceeds to Step 15. If any of the times $t_1$ to $t_4$ is not detected, the sequence returns to Step 20, and the time detecting program resumes to Steps 02 to 14.

Step 15 turns on the aural transmitter 54 when the detection of all the times $t_1$ to $t_4$ are finished, thereby informing the operator of the completion of the signal inputs.

In this way the times $t_1$ to $t_4$ at which the sensors $S_1$ to $S_4$ detect vibrations propagated from a touched point on the glass table 1 are recognized by the CPU 45, and the detected time $t_4$ is stored in the RAM 47.

The CPU 45 executes the process shown in the flowchart of FIG. 7, and arithmetically processes the time $t_1$ in accordance with the equations (3) and (4). Thus, the coordinate (x, y) of the point P designated by touching is obtained.

At Step 16, the time $t_3$ stored in the RAM 47 is deducted from time $t_1$, and a time difference $T_1$ in detection between the sensors $S_1$ and $S_3$ on the X-axis is obtained, and the results are stored in a memory area $M_5$ of the RAM 47.

At Step 17, a time difference $T_2$ in detection between the sensors $S_2$ and $S_4$ on the Y-axis is obtained, and the results are stored in a memory area $M_6$ of the RAM 47.

At Step 18 x is calculated by equation (3) and at Step 19 y is calculated by equation (4). At Step 20 it is judged to decide which is earlier detected, the time $t_1$ or $t_3$. If the time $t_1$ is earlier detected, the calculated value x is stored as a plus value in a memory area $M_x$ of the RAM 47. If the time $t_3$ is earlier detected, the x is stored as a minus value in a memory area $M_x$ of the RAM 47.

Step 23 decides which is earlier detected, the time $t_2$ or $t_4$. If the time $t_2$ is earlier detected, at Step 25 the calculated value y is stored as a plus value in a memory area $M_y$ of the RAM 47. If the time $t_4$ is earlier detected, at Step 25 the calculated value y is stored as a minus value in a memory area $M_y$ of the RAM 47.

In this way, the coordinate (x, y) of the point P designated by touching is determined, and is stored in a memory area of the RAM 47. The position of the point P is identified on the glass panel 1 by reference to the program whereby the input comes from the input panels 8, 9 or from the copiable area 2. The last-mentioned determination is effected; for example, by setting the center of the copiable area 2 as the origin 0 (0, 0) and finding whether the touching occurs within the coordinates ($-X_{10}$ to $X_{10}$, $-Y_{n-1}$ to $Y_{10}$). If it is found to be from within these coordinate, it is judged that it comes from the copiable area 2.

The input panels 8 and 9 are printed at places away from the copiable area 2, that is, rightward of the sensors $S_1$ (L<$X_{10}$, where L is on the X-axis), and downward of the sensor $S_1$ ($-L<-Y_n$, where $-L$ is on the Y-axis). The $K_1$ to $K_n$ on the input panel 8 are input keys whereby copying data such as the designation of a designated area for an original and the selection of copying modes, are input, wherein the key $K_n$ is allotted to the operation of the copying. Therefore, $K_1$ can optionally allocated to regions $Y_{10}$, and $K_2$ is allocated to regions $Y_9$ to $Y_8$.

In the input level panel 9, it is arranged that the value 1 corresponds to a region $-X_2$ to $-X_1$, the value 2 corresponds to a region $-X_1$ to 0, the value 3 corresponds to a region 0 to $X_1$ and so on. These regions are previously stored in the ROM 46, in which items corresponding to the respective regions are stored.

Figure 9:
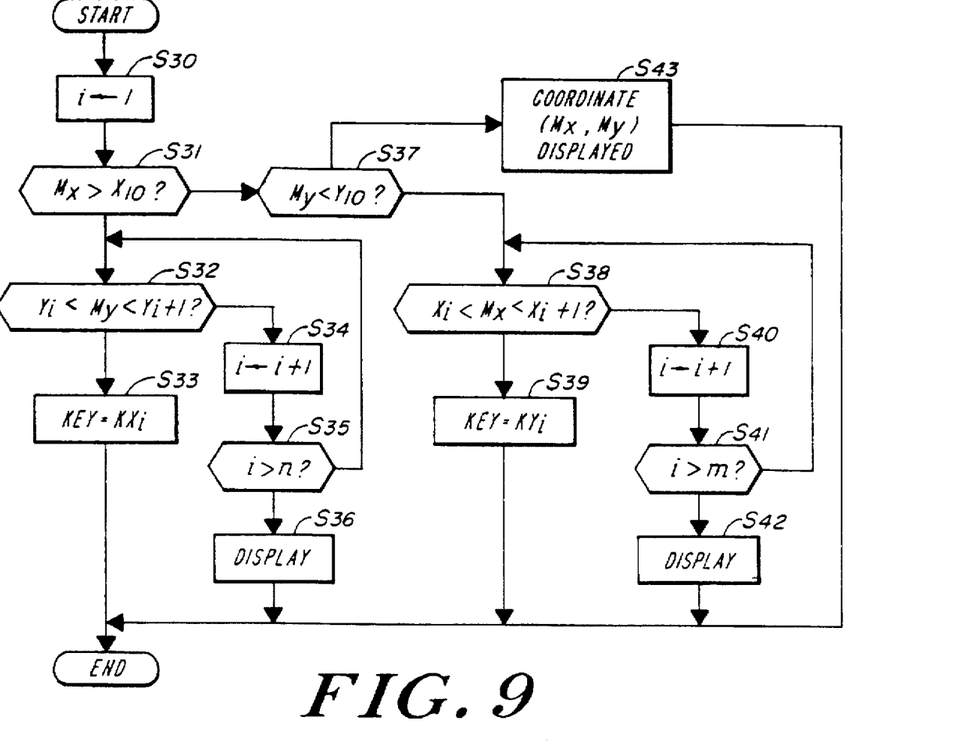
FIG. 9 is a flowchart showing the steps for checking areas where the detected input points are situated.

Referring to FIG. 9, a signal input will be described at a point P designated by touching. FIG. 9 shows a flowchart whereby it is judged which region in the RAM 47 the position calculated in FIG. 7 belongs to, thereby finding whether the signal is input as a key input from the input panels 8 and 9 or else as a designation of area. Moreover, the input key is also identified in the memory.

At Step 30 the value of the counter i is set to 1. This counter i shows an area within the input panel 8, and corresponds to number of keys in the input panel 8. The counter has a range from 1 to n so as to correspond to the keys $K_1$ to $K_n$ of the input panel 8 allotted to the coordinates $Y_{10}$ to $Y_n$. The ROM 46 reads the coordinates $Y_{10}$ to $Y_n$ which correspond to the number of the counter i.

Step 31 decides whether the $M_x$ on the X-axis for the detected point P is larger than the $X_{10}$ stored in the ROM 46. If it is found to be larger, Step 32 decides whether the $M_y$ on the Y-axis is between the $Y_{10}$ and $Y_9$ stored in the ROM 46.

At Step 34, if it is found to be between the $Y_{10}$ and $Y_9$, Step 33 decides that it is the key 1. If it is not between the $Y_{10}$ and $Y_9$, Step 33 adds "1" to the counter i so as to achieve (i=2).

Step 35 decides whether the counter i exceeds the number of keys. If it does not exceed it, the sequence returns to Step 32 where it is decides whether it is between $Y_9$ and $Y_8$. If it is between $Y_9$ and $Y_8$, Step 33 decides that it is key $K_2$.

The above-mentioned judgement is repeated until the counter i becomes n, thereby enabling any of the keys $K_1$ to $K_n$ to be designated.

Step 36 decides that an exact region has not been designated if the counter i exceeds, and displays "input again" through the display 55.

Steps 37 to 42 shows a flowchart whereby it is detected that the ten-key key board 9-1 and the display 10 are designated. In the same manner as Steps 32 and 36 any of the keys $KY_1$ to $KY_m$ has been designated.

At Step 43, if the values of $M_x$ and $M_y$ are found to be below $X_{10}$ and $Y_{10}$ at Steps 31 and 37, the coordinate $(M_x, M_y)$ of the point P designated by touching is displayed on the display 55 as numerals corresponding to the scales 13 and 14 printed along the glass panel 1, wherein the point P is evidently designated by touching in the copiable area 2. If two touched points are found, the rectangle having a diagonal as shown in FIG. 1 is input as a signal area.

In this way the position of the glass panel is identified by a point designated by touching the glass panel, and a signal is input corresponding to the designated area. The signal input device can per form level inputting, that is, input data about an image area of an original and other copying data to the copying machine from surface to surface.

Figure 10:
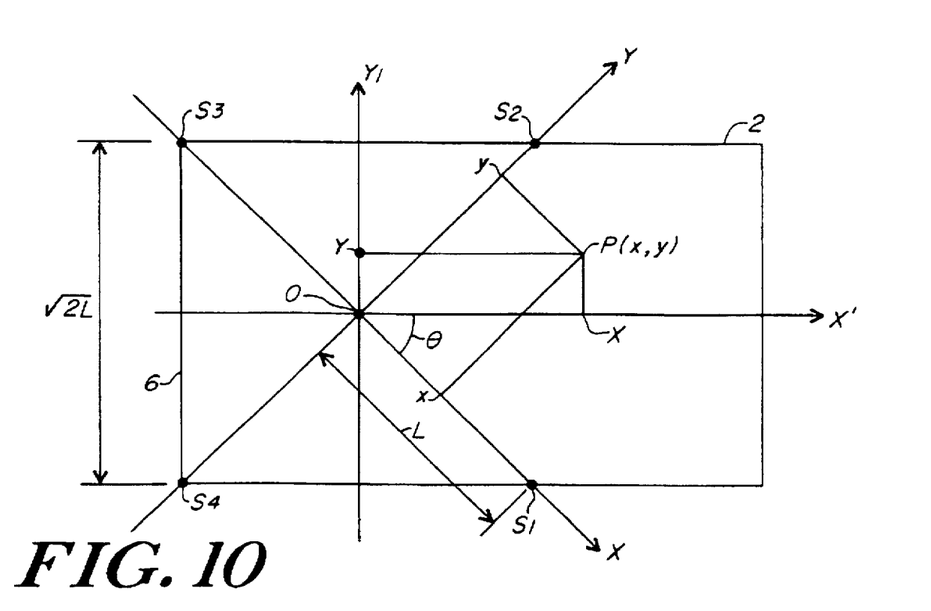
FIG. 10 is a top surface view showing another method of detecting input points.

FIG. 10 shows a further example which is provided sensors $S_3$ to $S_4$ located adjacent to each end of the reference line 6 of the glass panel 1, which are bondaries of the copiable area), and $S_1$ and $S_2$ located at two apexes of a square with a side extending from $S_3$ to $S_4$ and arranged in a counter-clockwise direction. The origin is placed at the center of this square, and the $OS_1$ is the X-axis, and $OS_2$ is the Y-axis. In the coordinates a touched point P has the coordinate (x, y). The direction from a middle point between the sensors $S_3$ and $S_4$ to the origin 0 is X', and the direction perpendicular to the X'-axis and extending from the origin 0 to a middle point between the sensors $S_2$ and $S_3$ is Y'-axis. Suppose that the coordinate of the point P on the X' and Y' axes is (X, Y). Then, an angle XOX' θ becomes 45°, and the following equations are established, which can be used for converting the coordinate in FIG. 2:

$$X = \frac{1}{\sqrt{2}}(x+y) \quad (8)$$

$$Y = \frac{1}{\sqrt{2}}(-x+Y) \quad (9)$$

By using these equations (8) and (9), the position of the point P can be calculated in the same arithmetic manner as described with respect to FIG. 2.

Under this arrangement of the sensors, in which they are arranged on the boundaries with an image area, so that they do not prevent the formation of an image. In addition, since the sensors are located on the bondaries of the copiable area on the glass panel 1, precision is achieved.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A signal input device for use in a copying machine for copying an original document, the device comprising:
    an operation panel including an input area in which data are input by touching a point on the operation panel, the operation panel also functioning as an original table of the copying machine on which the original document is placed;
    plural pairs of sensors, located at different places on the operation panel, for receiving vibrations propagated from a touched point on the operation panel, respectively, the plural pairs of sensors being arranged so that a line connecting the sensors of one of the plural pairs intersects a line connecting the sensors of another one of the plural pairs at right angles;
    a time counting means which starts to count time when one of the sensors receives a respective vibration;
    a detection means for detecting times at which the sensors receive the vibrations and for obtaining a time difference between the detected times by each pair of sensors by using the time counting means;
    an arithmetic means for identifying the position of the touched point on the basis of the time difference;
    a memory means for storing numerical values whereby the input area is divided into a plurality of minor areas;
    a means for judging, to which one of the plurality of minor areas the touched point belongs, on the basis of the arithmetic results indicating the position of the touched point and data of the numerical values;
    means for adjusting a copiable area defined within some of said minor areas to define a copying region for copying the original document, said copying region being defined based on said arithmetic results indicating the position of the touched point and data of the numerical values; and
    means for starting the arithmetic operation by treating the detected times as effective only when the copying machine is in a ready state in which the apparatus is ready for starting a copying operation.

2. A signal input device according to claim 1, wherein the input area comprises a first area in which the original document is placed and a second area in which the original document is not placed, and the sensors are located at the second area.

3. A signal input device according to claim 1, wherein the operation panel has a front surface and a back surface, and the sensors are located at the front surface.

4. A signal input device according to claim 1, wherein the operation panel has a front surface and a back surface, and the sensors are located at the back surface.

5. A signal input device according to claim 1, wherein the input area comprises a first area in which the original document is placed and a second area in which the original document is not placed, and the sensors are located on boundaries of the first area.

6. A signal input device according to claim 1, wherein the touched point is designated by a pen.

7. A signal input device according to claim 1, wherein the touched point is designated by a finger.

8. A signal input device according to claim 1, wherein the memory means stores a propagating speed of the vibration through the operation panel and distances between the sensors of each pair, and the propagating speed and the distances are used for identifying the position of the touched point by the arithmetic means.

9. A signal input device according to claim 1, wherein the operation panel is rectangular, the plural pairs of sensors comprise a first, a second, a third and a fourth sensors, which are arranged in a counterclockwise direction, a line connecting the first sensor and the third sensor intersects a line connecting the second sensor and the fourth sensor at right angles, and the detection means obtains the time differences between the detected times of the first and the third sensors and between the detected times of the second and the fourth sensors.

10. A signal input device for use in a copying machine for copying an original document, the comprising:

a transparent glass panel functioning as an original table which includes a first area in which the original document is placed thereby defining a copiable area and a second area in which the original document is not placed, both of the first area and the second area of the transparent glass panel allowing data to be inputted therefrom by touching a point on the areas;

plural pairs of sensors, located at the second area, the receiving vibrations propagated from a touched point on the glass panel, respectively, the plural pairs of sensors being arranged so that a line connecting the sensors of one of the plural pairs intersects a line connecting the sensors of another one of the plural pairs at right angles;

a time counting means which starts to count when one of the sensors receives a respective vibration;

a detection means for detecting times at which the sensors receive the vibrations and for obtaining a time difference between the detected times by each pair of sensors by using the counting means;

an arithmetic means for identifying the position of the touched point on the basis of the time difference;

a memory means for storing data of numerical values defining the second area of the glass panel as an input area for allowing copying data to be input;

a means for judging whether the position of the touched point identified by the arithmetic means is in the first area or not, on the basis of the data stored in the memory means;

a control means for using the result obtained by the judging means as input about a first original document when it arises from the copiable area or as input about copying data when it arises from the second area;

adjusting means for adjusting said copiable area in response to said control means based on said input to define a copying region for copying said first original document; and means for starting the arithmetic operation by treating the detected times as effective only when the copying machine is in the ready state in which the apparatus is ready for starting a copying operation.

11. A signal input device according to claim 10, wherein the touched point is designated by a pen.

12. A signal input device according to claim 10, wherein the touched point is designated by a finger.

13. A signal input device according to claim 10, wherein the memory means stores a propagating speed of the vibration through the operation panel and distances between the sensors of each pair, and the propagating speed and the distances are sued for identifying the position of the touched point by the arithmetic means.

14. A signal input device according to claim 10, wherein the operation panel is rectangular, the sensors comprise a first, a second, a third, and a fourth sensors, which are arranged in a counterclockwise direction, a line connecting the first sensor and the third sensor intersects a line connecting the second and the fourth sensor at right angles, and the direction means obtains the time differences between the detected times of the first and the third sensors and between the detected times of the second and the fourth sensors.

15. A signal input device for use in a copying machine, the device comprising:

an operation panel having an input area allowing an input by touching a point thereon, the input area also functioning as an original table on which an original document is placed;

plural pairs of sensors, located at different positions of the operation panel, for receiving vibrations from the touched point on the operation panel, respectively, the plural pairs of sensors being arranged so that a line connecting the sensors of one of the plural pairs intersects a line connecting the sensors of another one of the plural pairs at right angles;

a detection means, which has a timer, for detecting times at which the sensors receive the vibrations and for obtaining time difference between the detected times by each pair of sensors on the basis of the contents of the timer, the timer starting to count time when any one of the sensors receives a respective vibration;

a memory means for storing distances between sensors of each pair, a propagating speed of the vibrations through the operation panel, and numerical values whereby the input area is divided into a plurality of minor areas;

an arithmetic means for obtaining position data indicating a position of the touched point on the basis of the time difference, the distance and the propagating speed;

a judging means for judging, to which one of the minor areas the touched point belongs, to the basis of the position data obtained by the arithmetic means and the numerical values; and wherein the arithmetic means further comprises a means for starting the arithmetic operation by treating the detected times as effective only when the copying machine is in a stable operation state, the stable operation state being a ready state in which the copying machine is ready for starting a copying operation.

16. A signal input device according to claim 15, wherein the touched point is designated by a pen.

17. A signal input device according to claim 15, wherein the touched point is designated by a finger.

18. A signal input device according to claim 15, wherein the operation panel is rectangular, the sensors comprise a first, a second, a third, and a fourth sensors, which are arranged in a counterclockwise direction, a line connecting the first sensor and the third sensor intersects a line connecting the second sensor and the fourth sensor at right angles, and the direction means obtains the time differences between the detected times of the first and the third sensors and between the detected times of the second and the fourth sensors.

19. A signal input device according to claim 15, wherein the device further comprises means for adjusting a copiable area defined within some of said minor areas to define a copying region for copying the original document, said copying region being defined based on said arithmetic results indicating the position of the touched point and data of the numerical values.

20. A signal input device according to claim 15, wherein the input area comprises a first area in which an original document is placed and a second area in which the original document is not placed, and the sensors are located at the second area.

21. A signal input device according to claim 15, wherein the operation panel has a front surface and a back surface, and the sensors are located at the front surface.

22. A signal input device according to claim 15, wherein the operation panel has a front surface and a back surface, and the sensors are located at the back surface.

23. A signal input device according to claim 15, wherein the input area comprises a first area in which the original document is placed and a second area in which the original document is not placed, and the sensors are located on boundaries of the first area.

24. A signal input device according to claim 15, wherein the memory means stores a propagating speed of the vibration through the operation panel and distances between the sensors of each pair, and the propagating speed and the distances are used for identifying the position of the touched point by the arithmetic means.

25. A signal input device for use in a copying machine, the device comprising:
an original table integrally including a transparent region on which an original document is placed and an input region on which at least one operation key for inputting at least one copying condition is printed, both of the transparent region and the input region allowing data to be inputted therefrom by touching a point on the regions;
a plurality of vibration detection sensors provided on the original table for detecting vibration caused by touching a point on the original table;
means for specifying a position of the touched point on the original table based on the vibration detected by the vibration detection sensors; and
determination means for defining a copying region in a first condition in which the specified touched position is within the transparent region and processing the inputted copying condition in a second condition in which the specified touched position is within the input region.

26. A signal input device according to claim 25, wherein an input derived by touching a point on the original table is allowed to be effective only when the copying machine is in a ready state in which the copying machine is ready for starting a copying operation, and is ignored during the copying operation of the copying machine.

27. A signal input device according to claim 25, wherein the at least one key includes a key for performing image processing with respect to an image of the original document located in the defined copying region is printed on the input region.

28. A signal input device according to claim 27, wherein the image processing is trimming with respect to the image of the original document.

29. A signal input device according to claim 27, wherein the image processing is masking with respect to the image of the original document.

30. A signal input device according to claim 27, wherein the image processing is centering with respect to the image of the original document.

* * * * *